July 27, 1954

C. W. CUNDIFF, SR 2,684,543

MOLDBOARD ADJUSTMENT FOR V-TYPE DITCHING PLOWS

Filed June 13, 1950

INVENTOR
Charles W. Cundiff, Sr.

BY

ATTORNEY

July 27, 1954 C. W. CUNDIFF, SR 2,684,543
MOLDBOARD ADJUSTMENT FOR V-TYPE DITCHING PLOWS
Filed June 13, 1950 3 Sheets-Sheet 2
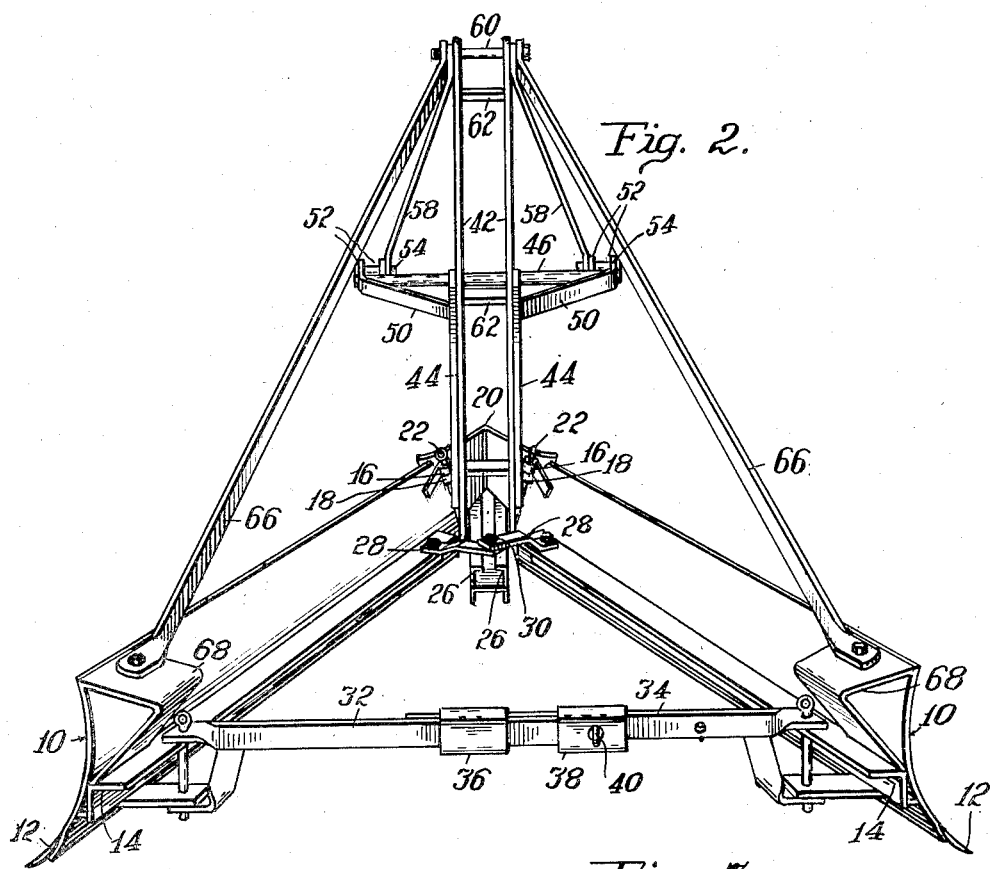
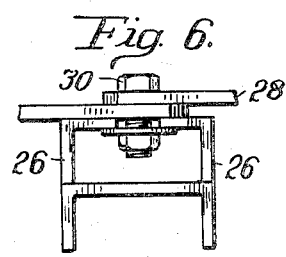
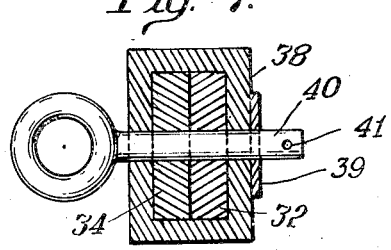
INVENTOR
Charles W. Cundiff Sr.
BY
ATTORNEY

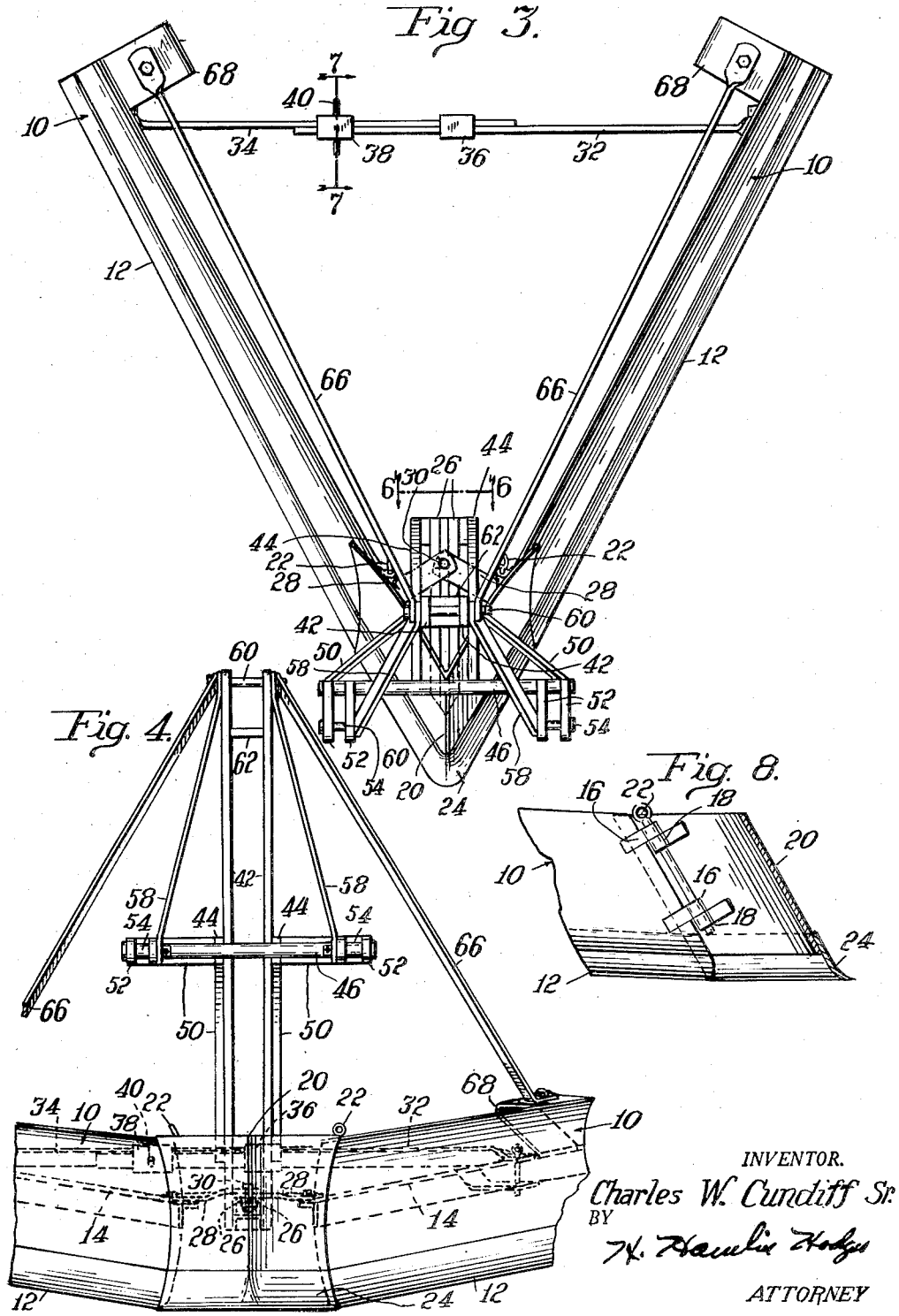

Patented July 27, 1954

2,684,543

UNITED STATES PATENT OFFICE 2,684,543

MOLDBOARD ADJUSTMENT FOR V-TYPE DITCHING PLOWS

Charles W. Cundiff, Sr., Owensboro, Ky.

Application June 13, 1950, Serial No. 167,861

1 Claim. (Cl. 37—98)

In the past many devices have been provided whereby a ditcher plow may be attached to a tractor to be pulled over the ground for producing a desired ditch.

My present invention is for a hydraulic lift two way ditcher which is designed so that a desired ditch may be started close to fences, walls, roads or the like.

An object of my invention is to provide a ditcher which may be readily adjusted to dig wide or narrow, and/or deep or shallow ditches.

A further object is to provide a ditcher which may be readily controlled relative to depth of the ditch from a traction element.

A still further objects is to provide a two way ditcher adapted to be pivotally raised and lowered from a traction element.

In the drawings:

Fig. 2 is a perspective view looking from the rear;

Fig. 3 is a top plan view;

Fig. 4 is a view in front elevation, partly broken away;

Fig. 6 is an enlarged fragmentary view, partly broken away, taken on the line 6—6 of Fig. 3, looking in the direction of the arrows;

Fig. 7 is a vertical cross-section on the line 7—7 of Fig. 3, looking in the directing of the arrows; and Fig. 8 is a fragmentary vertical cross-section showing the plow point and a portion of a scraper blade.

Figure 1:
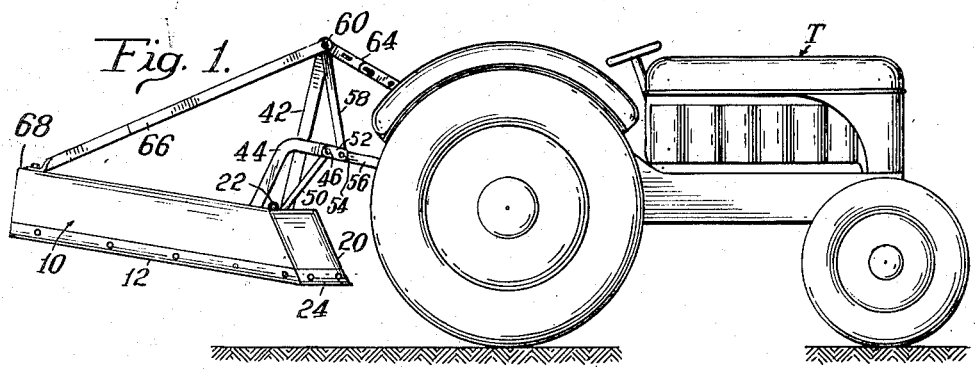
Fig. 1 is a view in side elevation showing the two way ditcher attached to a conventional tractor.
Figure 5:
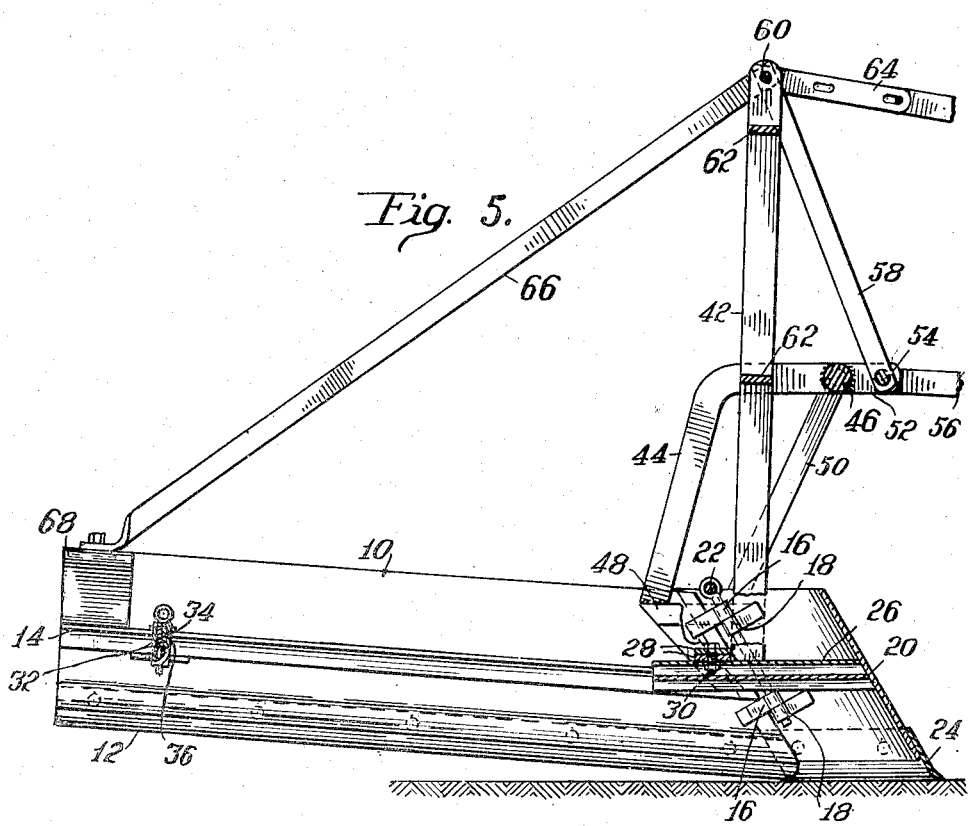
Fig. 5 is a view in longitudinal cross-section, partly broken away.

In Fig. 1 I have shown a conventional or standard tractor T to the rear end of which my two way ditcher is attached. Although Fig. 1 discloses the ditcher plow point slightly above the level of the ground on which the tractor is positioned, it will be understood that while in use the ditcher plow point will be at least upon the ground level as shown in Fig. 5.

The ditcher blades 10 are preferably made of hard metal and have suitably bolted, riveted, welded or otherwise secured thereto scraper edges 12, preferably of case-hardened steel. The blades 10 are arranged in a substantially V-shaped position and which, on their inner surfaces, are provided with angle irons 14 which may be welded or otherwise secured thereto. Near the apex of the V-shaped positioned blades 10, eyes 16 are secured, and to which, eyes 18 welded to a plow point 20 are aligned, so that the eyes 16 and 18 may be held in proper position by a slide bolt 22 passing therethrough. At the bottom edge of the plow point 20, a border 24 of case-hardened steel is secured and is adapted to be in approximate alignment with the case-hardened border or scraper edge 12 secured on the blades 10.

Extending inwardly from the plow point 20 I provide suitable horizontally positioned angle iron beams 26 which are spaced apart to provide a void space in approximate alignment with the apex edge of the plow point. Bolted pivotally to the angle iron beams 26, I provide links 28 which are pivotally bolted to the angle irons 14 secured to the scraper blades 10. The links 28 are of such length that by extending from the angle irons 14 on each of the scraper blades 10, they form a V, the reverse of the V on the plow point 20. By loosening the pivot bolt 30 securing the links 28 to the angle iron beams 26, the scraper blades 10 may be moved in either direction to expand or contract their V-shaped arrangement. Upon satisfactory adjustment, bolt 30 will be tightened as well as conventional bolts bolting links 28 to their respective angle irons 14 on the scraper blades.

Near the ends of the scraper blades remote from the apex or plow points thereof, I pivotally secure extensible and slidably aligned bars 32 and 34. The bars 32 and 34 are positioned to slide through and be held together by suitable collars 36 and 38. The collar 38 is provided with an aperture 41 therethrough so that the pin 40 may be inserted through apertures provided in the bars 32 and 34. Preferably I provide a washer 39 which may be positioned over the end of the pin 40 between the collar 38 and a conventional cotter pin (not shown) inserted in the aperture 41 in the pin 40. Thus, the ends of the scraper blades remote from the plow point may be suitably maintained in their predetermined spaced apart positions.

Posts 42 are welded to the angle iron beams 26 at substantially right angles thereto and extend upwardly above the scraper blades 10. The posts 42 are reenforced by inverted L-shaped braces 44 welded thereto and to the angle iron beams 26. The L-shaped braces 44 extend forwardly of the posts 42, and at their ends have secured thereto, preferably by welding, a substantially horizontal rod 46. Near the other end of the L-shaped braces 44, I provide an additional reinforcing bar 48 which is welded to the L-shaped brace 44, and at its other end to the post 42 (see Fig. 5). Near the ends of the rod 46, braces 50 extend downwardly and are welded or otherwise secured to the posts 42 near their point of attachment to the angle irons 14.

Secured near the ends of the rod 46, and extending outwardly in spaced-apart relationship, I secure links 52 which are drilled to provide for a bolt 54 to be passed therethrough to engage the bar 56 extending therefrom to a standard Ferguson hitch on the tractor T. Extending upwardly and welded to the inside spaced-apart links 52, I provide braces 58 which at their upper ends are secured to the uppermost ends of the posts 42 by a suitable bolt 60. In order to properly space apart the two posts 42, I provide spacer bars 62, the lengths of which are equal to the combined width of the spaced apart angle irons 26. Pivoted to the bolt 60, I provide a conventionally adjustable rod 64 adapted to be attached to a conventional hydraulic piston or pump on the tractor.

Also secured in position at the uppermost ends of the posts 42, I provide braces 66 which extend downwardly therefrom and are bolted or otherwise secured to shoulders 68 formed on, or welded to, the ends of the scraper blades 10, remote from the plow point 20.

It will be understood that the bar 56 is secured to a standard Ferguson hitch on the tractor T, and consequently it can be raised or lowered relative thereto to adjust the position of the plow point 20 relative to the ground level. By connecting the adjustable rod 64 to a hydraulic power device on the tractor, the rod 64 may be withdrawn or extended relative to the tractor and consequently the slant of the ditcher may be controlled by the operator. Obviously the operator may control all from his position on the tractor, with the exception, of course, of his having to adjust the width of the ditch to be graded by lengthening or shortening the total length of the rods 32 and 34, thus separating or drawing together the ends of the scraper blades remote from the plow point 20.

I claim:

A ditcher including a plow point, horizontal beams extending inwardly from the apex of said plow point providing a guideway therebetween; spaced apart hinge eyes secured to the inner faces of said plow point; vertical posts secured to and extending upwardly from said horizontal beams; braces secured to said horizontal beams, extending upwardly therefrom, secured to said vertical posts, and extending horizontally forward thereof; scraper blades hingedly secured to said hinge eyes; links pivotally bolted to said scraper blades and pivotally and slidably mounted on said horizontal beams for adjusting the blades inwardly and outwardly with respect to said beams, said links forming a V in reverse to the plow point apex; braces extending from the top of said posts to the ends of said scraper blades remote from their hinge connection to said plow point; and means connecting said first mentioned braces and the top of said vertical posts to a tractor.

References Cited in the file of this patent

UNITED STATES PATENTS

| Number | Name | Date |
|---|---|---|
| 2,320,624 | Love | June 1, 1943 |
| 2,359,121 | Kinnan | Sept. 26, 1944 |
| 2,423,894 | Lambert | July 15, 1947 |
| 2,453,723 | Palmer et al. | Nov. 16, 1948 |
| 2,527,613 | Zagurski | Oct. 31, 1950 |